US009096809B2

(12) United States Patent
Goel et al.

(10) Patent No.: US 9,096,809 B2
(45) Date of Patent: Aug. 4, 2015

(54) PROCESS FOR GENERATING ENERGY FROM ORGANIC MATERIALS AND/OR BIOMASS

(76) Inventors: Prerak Goel, Mumbai (IN); Christopher Frederik Thannhaeuser, Dusseldorf (DE)

( * ) Notice: Subject to any disclaimer, the term of this patent is extended or adjusted under 35 U.S.C. 154(b) by 879 days.

(21) Appl. No.: 13/322,799

(22) PCT Filed: Nov. 13, 2009

(86) PCT No.: PCT/IN2009/000644
§ 371 (c)(1),
(2), (4) Date: Nov. 28, 2011

(87) PCT Pub. No.: WO2010/137028
PCT Pub. Date: Dec. 2, 2010

(65) Prior Publication Data
US 2012/0073198 A1 Mar. 29, 2012

(30) Foreign Application Priority Data
May 28, 2009 (IN) .......................... 1312/MUM/2009

(51) Int. Cl.
| | |
|---|---|
| *C10J 3/46* | (2006.01) |
| *C10J 3/72* | (2006.01) |
| *C10B 49/16* | (2006.01) |
| *C10G 35/02* | (2006.01) |
| *C10K 3/02* | (2006.01) |
| *C10B 49/18* | (2006.01) |
| *C10B 53/02* | (2006.01) |

(Continued)

(52) U.S. Cl.
CPC . *C10K 3/02* (2013.01); *C01B 3/384* (2013.01); *C10B 49/18* (2013.01); *C10B 53/02* (2013.01); *C10J 3/12* (2013.01); *C01B 2203/0233* (2013.01); *C01B 2203/0811* (2013.01); *C01B 2203/0894* (2013.01); *C01B 2203/1058* (2013.01); *C10J 2300/0916* (2013.01); *C10J 2300/0976* (2013.01); *C10J 2300/0993* (2013.01); *C10J 2300/1637* (2013.01); *C10J 2300/1853* (2013.01); *C10J 2300/1861* (2013.01); *C10K 3/023* (2013.01); *Y02E 50/14* (2013.01)

(58) Field of Classification Search
CPC combination set(s) only.
See application file for complete search history.

(56) References Cited

U.S. PATENT DOCUMENTS 3,004,839 A * 10/1961 Tornquist ................... 48/197 R
3,847,567 A * 11/1974 Kalina et al. ................ 585/733

(Continued)

FOREIGN PATENT DOCUMENTS

| DE | 19755693 | 7/1999 |
|---|---|---|
| DE | 10055360 | 6/2002 |

OTHER PUBLICATIONS

International Search Report dated Nov. 24, 2010 in counterpart International Application No. PCT/IN2009/000644.

*Primary Examiner* — Kaity Handal
(74) *Attorney, Agent, or Firm* — Ohlandt, Greeley, Ruggiero & Perle, L.L.P.

(57) ABSTRACT

The present invention relates to a process and a system for generating energy from biomass/organic wastes. A process for generating a product gas from biomass comprises of pyrolyzing the biomass in a pyrolyzer by contacting the biomass with hot heat carriers to obtain pyrolysis gas and char; passing the pyrolysis gas to a reformer containing a reactant to obtain a product gas; and firing a part of the product gas coming out of the reformer back to the heater tubes of the reformer. Firing a part of the product gas through the fired heater tubes of the reformer provides the heat for sustaining the reaction between the pyrolysis gas and the reactant to form the product gas.

24 Claims, 2 Drawing Sheets

(51) Int. Cl.
*C01B 3/38* (2006.01)
*C10J 3/12* (2006.01)

(56) References Cited

U.S. PATENT DOCUMENTS

| | | | | |
|---|---|---|---|---|
| 4,118,204 A | * | 10/1978 | Eakman et al. | 48/197 R |
| 4,211,538 A | * | 7/1980 | Eakman et al. | 48/197 R |
| 7,951,350 B1 | * | 5/2011 | Taylor | 423/418.2 |
| 8,349,288 B2 | * | 1/2013 | Norbeck et al. | 423/650 |
| 8,603,430 B2 | * | 12/2013 | Norbeck et al. | 423/650 |
| 2003/0062154 A1 | * | 4/2003 | Vinegar et al. | 166/60 |
| 2004/0035788 A1 | * | 2/2004 | Schmid et al. | 210/634 |
| 2007/0289214 A1 | * | 12/2007 | Briesch et al. | 48/61 |

\* cited by examiner

PROCESS FOR GENERATING ENERGY FROM ORGANIC MATERIALS AND/OR BIOMASS

FIELD OF THE INVENTION

The present invention relates to a system and a process for generating energy by the decomposition of biomass and/or organic materials.

DESCRIPTION OF THE BACKGROUND ART

Biomass and organic wastes are renewable energy sources. Both these sources have the potential to be utilized for the production of Green Energy. Pyrolysis and gasification processes have been known for the decomposition of biomass and organic materials and their utilization in generating energy which could be used for number of purposes. Even though pyrolysis or gasification have been reported to be used for the utilization of biomass and organic materials, still their application on a commercial scale has been on a limited level, reason being reduced process energy efficiency, low calorific value, high gas volume, very high tar content in the gas, high temperature zones, the design of the system is such that it has been limited to handle single feedstock, thereby limiting the use of the system.

U.S. Pat. No. 7,077,878 disclose a process for gasifying organic materials. The system used to carry out the process comprises of, the heating up zone, the second reaction zone (reformer) and a pyrolysis reactor. These are successively connected one after the other from the top down. The process comprises the steps of introducing the organic material into a pyrolysis reactor. The organic materials come in contact with the heat carrying medium dropping from the heating up zone in the pyrolysis reactor and are split into a carbon containing residue and pyrolysis gases. The pyrolysis gases are moved to the second reaction zone. The carbon containing residue and the heat carrying medium proceed to a separation stage, whereby the carbon containing residue and the heat carrying medium are separated. The heat carrying medium is passed to the heating up zone and the carbon containing residue is further burned in a firing stage. The burning of the carbon containing residue generates hot exhaust gases which is passed to the heating up zone to pass their heat to the heat carrying medium. The heat carrying medium is further extracted into the second reaction zone wherein it heats the already present mixture of pyrolysis gases and the reactant steam converting it to the product gas. The mixture of pyrolysis gas and reactant steam also receives heat from the firing stage. The heat carrying medium is further recycled to the pyrolysis reactor. As can be seen, this process utilizes the heat carrying medium in every stage. Also, the heat is transferred from the firing stage to the heating up zone and the second reaction zone. This process requires lot of heat transfer resulting in a wastage of significant amount of energy. Also, the heat carrying medium is of uniform size.

CA 02496907 discloses a process to recover hydrogen from organic wastes. The process comprises of heating organic wastes under a non-oxidative atmosphere at a temperature from 500 to 600 deg C. The pyrolysis gases obtained are mixed with steam at a temperature from 900-1000 deg C. to obtain reformed gases from which hydrogen is separated. The heat to carry out the pyrolysis and reforming reactions are provided by heat carrying mediums. In this process, heat carrying medium is used in both, the pyrolysis as well as the reforming stage. This process utilizes the heat carrying medium in every stage. This process requires lot of heat transfer resulting in wastage of significant amount of energy.

U.S. Pat. No. 6,084,147 disclose a two stage method for decomposing waste materials. Both the stages are carried out in steam reformers connected back to back containing inert media bed made of large, high density beads such as alumina beads. The fluidizing gases composed of oxygen and superheated steam are injected in the first stage, wherein they pyrolyze the wastes at a temperature in the range of 450 deg C. to 800 deg C. Carbon and unpyrolysed wastes are carried to the second stage, wherein pyrolysis continues under essentially under the same conditions as that of the first stage. The gases generated in the process are treated in conventional ways. This invention also involves Fluidized bed with the fluidizing gases, being a mixture of air/oxygen/nitrogen, adding to the overall gas volume and thus diluting the final gas calorific value and limiting economical utilization.

U.S. Pat. No. 6,048,139 discloses a method for processing waste or biomass material comprising the steps of a) the waste or biomass material is subjected to a pyrolysis at a temperature of 350-650. degree. C advantageously 450-550. degree. C.; (b) the gas released in the course of the pyrolysis is subjected without condensation to a cracking treatment at a temperature of 1100-1600. deg C., advantageously 1200-1400. deg C., under the influence of oxygen-rich gas introduced from outside and possibly of steam; (c) the residue liberated in the course of the pyrolysis is gasified under a pressure of 0.5-1.5 bar, advantageously 0.8-1.2 bar, at a temperature of 1200-1700. deg C., advantageously 1400-1600. deg C., and is volatilized or, as the case may be, fused under reducing conditions; (d) the fused slag or metal concentrate obtained under stage (c) is discharged or, as the case may be, recovered; (e) the product gases obtained in the course of stages (b) and (c) are combined or not combined and then subjected to gas cleaning.

SUMMARY OF THE INVENTION

It is an object of the invention to provide a highly energy efficient process for the decomposition of wastes and biomass.

It is another object of the invention to produce a product gas with high calorific value.

The present invention relates to a process of generating product gas from biomass and/or organic materials. The process comprises the steps of pyrolyzing the biomass and or organic material in a pyrolyser by contacting the biomass with hot heat carriers to obtain pyrolysis gas. The heat carriers along with the char generated during pyrolysis is carried to an input heater. The char is burned in the char burning zone of the input heater and the heat carrier is heated in the heat carrier zone of the input heater. The hot gases generated from burning the char are utilized for heating the heat carriers, which provides the necessary energy for pyrolysis reaction in the pyrolyser. The pyrolysis gases generated from pyrolysis of the biomass are transferred to a reformer. A fraction of the product gas coming out of the reformer is then channeled back through the heater tubes of the reformer and combusted therein to heat the incoming pyrolysis gas in the reformer so as to provide the requisite heat to generate the product gas.

DETAILED DESCRIPTION OF THE PREFERRED EMBODIMENTS

Figure 1:
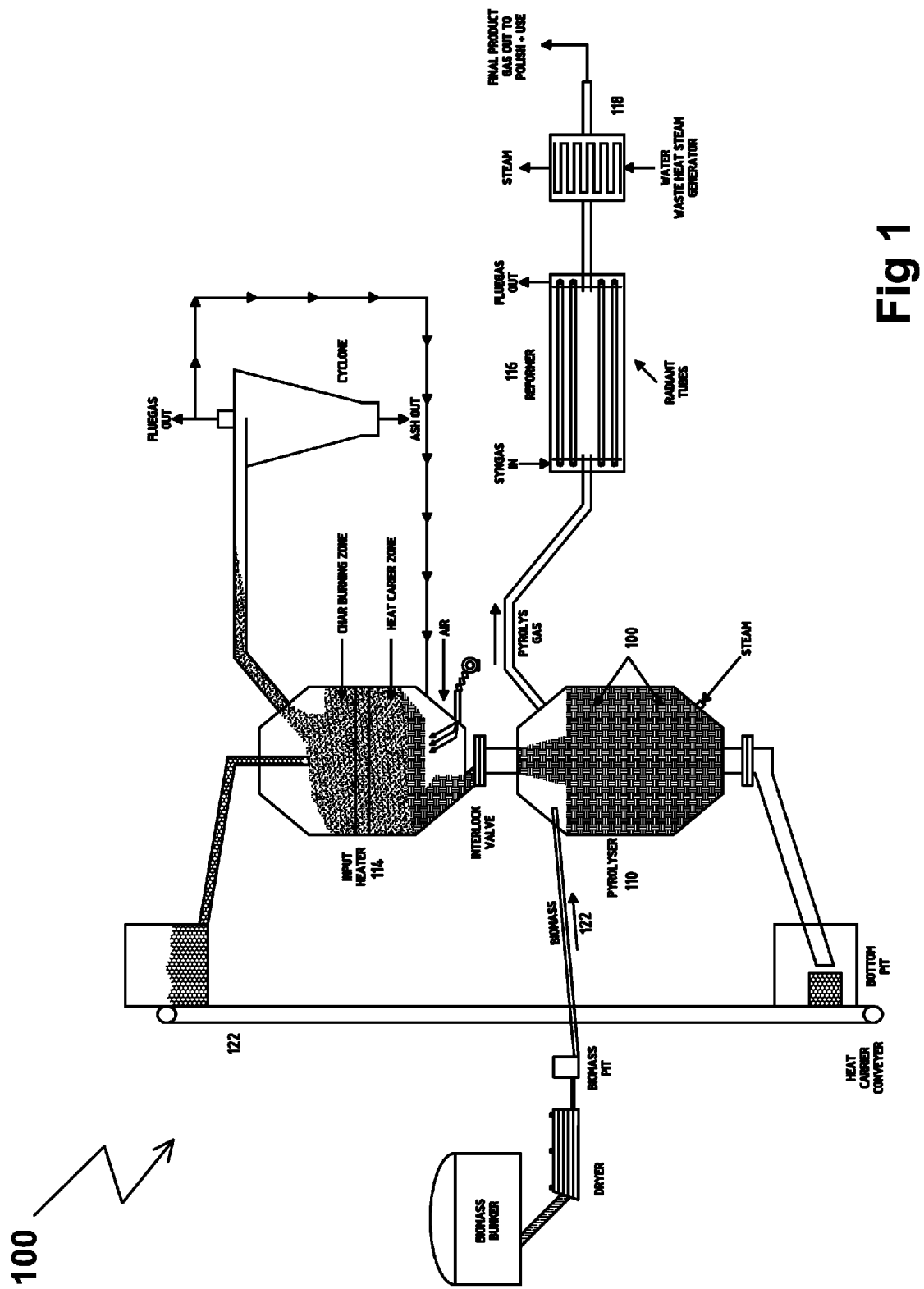
FIG. 1 illustrates the system used for carrying out the process of decomposition of the organic wastes and/or biomass according to an embodiment of the invention.

According to an embodiment of the present invention and FIG. 1, a system (100) to carry out the process for obtaining a product gas is further illustrated. The biomass and/or organic wastes to be decomposed to obtain pyrolysis gases are fed to a pyrolyser (110) by means of a conveyor (106). Preferably, the pyrolyser (110) is a moving bed reactor. The pyrolyser (110) contains hot heat carriers (108) coming from the input heater. The input heater is preferably a Fluidized Bed combustor. The temperature of the heat carriers is between 500 deg C. to 700 deg C. Steam is also fed to the pyrolyser. The heat carriers (108) are selected from aluminium oxide, steel, titania. The preferable heat carriers are aluminium oxide. The heat carriers (108) used for heating the biomass and/or organic wastes are of variable size. The size of the heat carriers (108) ranges from 5 mm to 25 mm. The preferable size of the heat carriers is from 8 mm to 15 mm. The variable size range of the heat carriers create varying size of voids and thus lead to greater contact area with biomass and/or organic materials which in itself is of variable size, thus causing efficient decomposition of the biomass. The hot heat carriers transfer their heat to the biomass thereby decomposing it and producing pyrolysis gases and a high carbon residue, char. The temperature of pyrolysis is maintained from 450 deg C. to 650 deg C. The residence time of the heat carriers ranges from 30 min to 90 min. Depending on the size and quality of the input material or the biomass/organic wastes, the temperature and the residence time of the input material in the pyrolyser (110) will differ. The entire process is carried out in an oxygen deprived environment. The absence of oxygen does not add to the overall gas volume and results in high calorific value of the final output gas thereby enhancing economic utilization.

The pyrolysis gas coming out of the pyrolyser (110) is further mixed with steam and led to the second stage that is to the reformer (116). The remaining char and heat carriers are led to an input heater (114) by means of a conveyor belt (122), wherein the heat carriers are heated to raise their temperature to 500 deg C. to 700 deg C. so as to be again fed or recycled in to the pyrolyser. Char is combusted in a char burning zone of the input heater (114) and the combustion heat is absorbed by the heat carriers in the heat carrier zone to increase their temperature to 500-700 deg C. The ash left behind is fluidized and extracted by cyclones, before the flue gas is led to suitable cleaning and treatment.

In the second stage, pyrolysis gas or syngas from the pyrolyser (110) are led to a reformer (116). Preferably, the reformer (116) is a Gas Fired Heater. The reformer (116) contains a reactant. The reactant is preferably steam. The pyrolysis gas is preferably heated to a temperature of 800-1200 deg C. in the presence of a catalyst and the reactant to get the product gas. The catalyst is preferably nickel oxide. A fraction of the product gas coming out of the reformer is then channeled back through the heater tubes of the reformer (116) and combusted therein to heat the incoming pyrolysis gas in the reformer (116) so as to provide the requisite heat to generate the product gas. In this way, the process becomes self providing in its heat requirement. Firing a part of the product gas through the fired heater tubes of the reformer provides the heat for sustaining the reaction between the pyrolysis and the reactant to form the product gas. The product gas coming out of the reformer passes through a waste heat steam generator (118) for lowering the temperature of the product gas and generating steam from the waste heat steam generator (118). The steam generated from the waste heat steam generator is recycled to the pyrolyser. The final product gas after passing through the waste heat steam generator (118) comes out of the reformer outlet (120).

The final product gas is free of more than 98% tar content and enriched in concentration of hydrogen. The final product gas is led to the final gas utilization section. Based on the input quality, and the quality of the synthesis gas, the extent of product gas cleaning or polishing is decided and accordingly product gas cleaning is provided for. The final product gas is then led to the final gas utilization section. Based on the need this gas can be lead to—

- A gas engine for generation of electricity and waste heat from the engine cooling.
- The product gas can also be lead to various product end uses such as hydrogen, methanol, DME, ethanol, etc.

According to another embodiment of the present invention a process for decomposition of the input materials or organic wastes or biomass comprises the steps of reducing the moisture content of the input material to below 30%. The particle size of the input material is also reduced below 25 mm. The reduction in moisture from levels of 50% to 30% is carried out with the help of a dryer that is integrated with the system. The energy to drive the drying process comes from the waste heat generated during the process for the decomposition. This is in the form of steam and hot flue gas. The input material after drying is sent to the pyrolysis reactor by means of a screw conveyor at a temperature of 60-70 deg. C. The pyrolysis and reforming is carried out further as has been described above.

Figure 2:
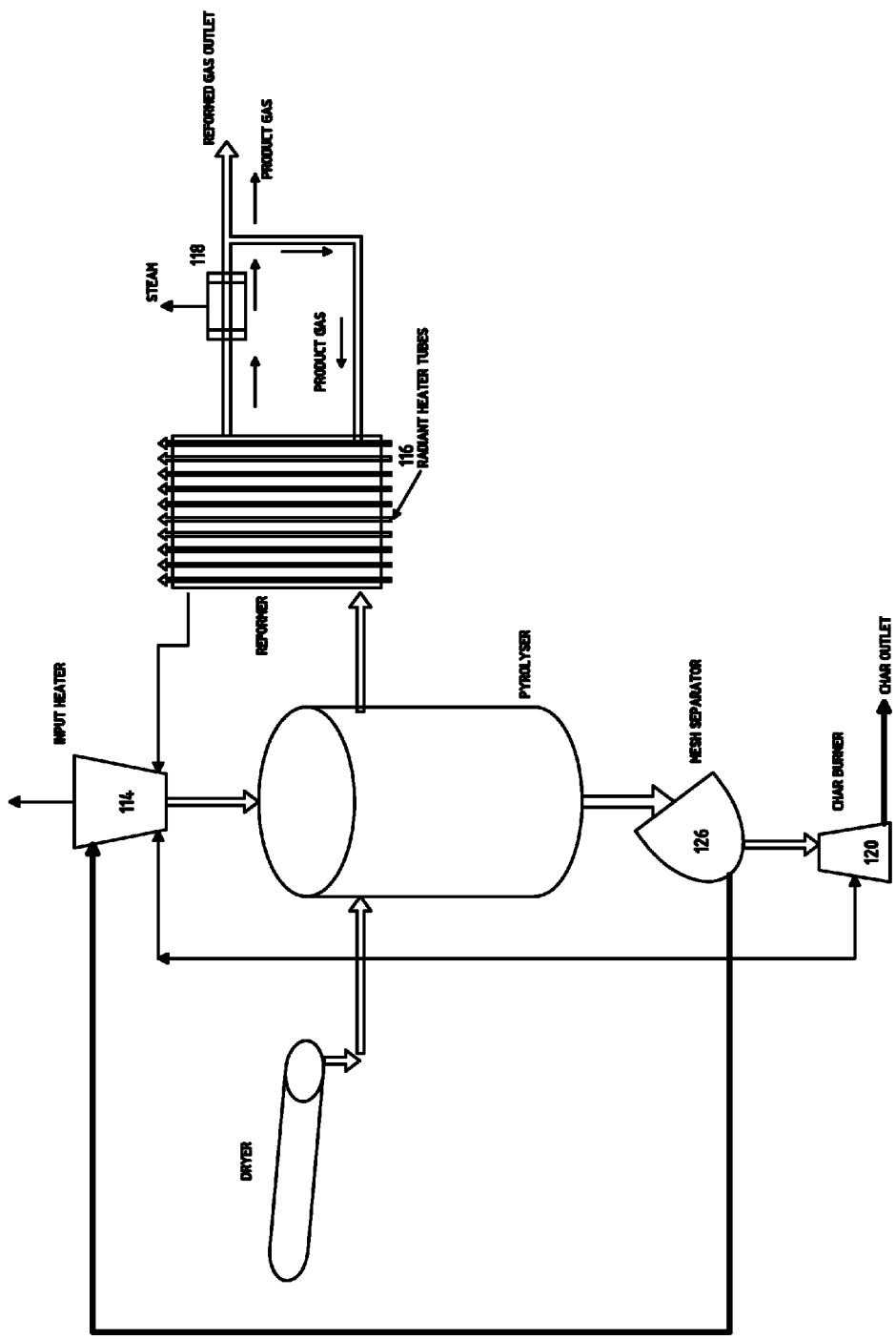
FIG. 2 illustrates another system used for carrying out the process of decomposition of organic wastes and/or biomass according to another embodiment of the invention.

FIG. 2 depicts one of the embodiments of the present invention, wherein the char obtained after pyrolysis along with the heat carrier as described in the above process are led to a mesh separator (126). The separated heat carrier is sent to the input heater (114) by means of an elevator and the char is either extracted or sent to the char burning section. The char is heated in the char burning section (128). The hot gases generated from the char burning section is used to heat the heat carriers present in the input heater (114). The temperature of the heat carriers is maintained between 500 to 700 deg C. This is used as the input heat supplied to the pyrolysis reactor (110).

According to another embodiment of the present invention a process for decomposition of the input materials or organic wastes or biomass comprises the steps of reducing the moisture content of the input material to below 30%. The particle size of the input material is also reduced below 25 mm. The reduction in moisture from levels of 50% to 30% is carried out with the help of a dryer (106) that is integrated with the system. The energy to drive the drying process comes from the waste heat generated during the process for the decomposition. This is in the form of Steam and hot flue gas. The input material after drying is sent to the pyrolysis reactor (110) by means of a screw conveyor at a temperature of 60-70 deg. C. The further processes of pyrolysing and reforming are carried out as described above.

According to another embodiment of the invention, a process is disclosed to carry out the reforming reaction of the pyrolysis gas to obtain a product gas in the process of decomposition of the organic wastes or biomass. The process comprises the steps of introducing a pyrolysis gas in a reformer (116). The reformer (116) contains a reactant and a catalyst. The reactant preferably is steam. The catalyst is preferably nickel oxide. The pyrolysis gas entering the reformer is converted to a product gas in the presence of the reactant and the catalyst. The temperature of the reformer, is maintained in between 800 deg C.-1200 deg C. A fraction of the product gas coming out of the reformer is then channeled back through the heater tubes of the reformer (116) and combusted therein to heat the incoming pyrolysis gas in the reformer (116) so as to provide the requisite heat to generate the product gas. In this way, the process becomes self providing in its heat requirement. Firing a part of the product gas through the fired heater tubes of the reformer provides the heat for sustaining the reaction between the pyrolysis and the reactant to form the product gas. The reformer (116) is preferably a Gas Fired Heater.

Another embodiment of the present invention discloses a system for carrying out the process to generate energy from organic materials and/or biomass. The system comprises of a pyrolyser (110) wherein the input material or biomass or organic wastes are pyrolysed to generate pyrolysis gas or syngas. The pyrolyser (110) is preferably a moving bed reactor. The pyrolyser (110) is connected to a reformer (116) wherein the pyrolysis gas from the pyrolyser (110) is heated to yield the product gas. The reformer (116) is preferably a Gas Fired Heater. The pyrolyser, input heater and the gas fired heater are connected in series or parallel.

A very important aspect of the invention is to use variable sized heat carriers. Another important aspect is to utilize the product gas as internal energy source for the reformation reactions. There is no heat carrier used in the reformer (116) thereby saving lot of energy and resulting in a highly efficient product (clean gas).

The invention preferably utilizes a moving bed pyrolysis reactor and a fixed bed reactor or a gas fired heater (reformer) to achieve desired heat transfer with varying particle size load. This is easily facilitated by the use of a variable mix of size of the heat carrying medium, catering to a varied/non constant size mix of voids within which the input material is held. The heat and mass flow of the heat transfer medium into the pyrolysis reactor can also be easily varied, without effecting conditions at any other section of the plant/process.

The variable particle size and ability to control heat & mass flow of the Heat carrier material is what imparts high efficiency to the pyrolysis reaction.

The process uses the product gas as internal energy source for the reformation reactions. The use of clean product gas makes the heat transfer very efficient and provides the ability for easy process control based on specific input conditions prevailing at that time. As no biomass or fuel source of biomass origin is used for high temperature heat, no risk of ash fusion exists.

There are no heat carriers used in the reformers thereby saving energy and causing an efficient process. As there are no heat carriers in the reformer, it can be placed besides the input heater and the pyrolysis reactor.

The highly efficient and controllable reformation makes it possible to consistently generate a highly quality final product gas with highly reduced amount of tar content in the final product gas.

Each of the process conditions in individual sections can be individually controlled. The use of energy sources gives the ability to control the outputs.

While the present invention has been described herein with respect to the various exemplary embodiments, it will be apparent to one of the ordinary skill in the art that many modifications, improvements and sub combinations of the various embodiments, adaptations and variations can be made to the invention without departing from the spirit and the scope thereof.

Example 0.158 kg/sec of the biomass with 15% of moisture was fed to the pyrolyser. Aluminium oxides were provided as heat carriers and were heated to 750 deg C. in the input heater. 1.33 kg/sec of hot aluminium oxide were introduced in the pyrolyser to pyrolyse the biomass and generate pyrolysis gas. 0.132 kg/sec steam was introduced in to the pyrolyser at 150 deg C. Aluminium oxide and the char obtained during pyrolysis were taken to the input heater. The char was burned in a char burning section and the heat generated was used to heat aluminium oxide. The heated aluminium oxide was recycled to the pyrolyser so as to continue pyrolysis of the biomass. Pyrolysis gas at a flow of 0.21 kg/sec was introduced in to the reformer. The pyrolysis gas was introduced in the reformer at temperature of 700 deg C. A final product gas was generated from the reformer at 900 deg C. A part of the final product gas was channeled to the reformer and combusted therein to maintain the temperature of the reformation reaction at 900 deg C. The product gas coming out from the reformer was fed into a waste heat steam generator at a flow of 0.2045 kg/sec. The final temperature of the product gas coming out of the waste heat steam generator was 150 deg C. The steam generated from the waste heat steam generator was taken to the pyrolyser at 0.132 kg/sec at 150 deg C. The final product stream was taken for cleaning and use in various areas. The following components of the product gas were obtained:

$H_2$—44.4%
$CO_2$—23%
$CO$—13%
$CH_4$—8.1%
Calorific value–550 kcal/Nm3

The invention claimed is:

1. A process for generating a product gas from biomass, the process comprising:
   pyrolyzing the biomass in a pyrolyser by contacting the biomass with hot heat carriers to obtain pyrolysis gas and char;
   passing the pyrolysis gas to a reformer containing a reactant to obtain a product gas; and
   firing a part of the product gas coming out of the reformer inside radiant heater tubes of the reformer;
wherein firing a part of the product gas through the radiant heater tubes of the reformer provides the heat for sustaining the reaction between the pyrolysis gas and the reactant to form the product gas.

2. The process as claimed in claim 1, wherein the pyrolyser is preferably a moving bed reactor.

3. The process as claimed in claim 2, wherein the heat carriers are of variable size.

4. The process as claimed in claim 1, wherein the reformer is preferably a gas fired heater.

5. The process as claimed in claim 4, wherein the size of the heat carriers is from 5 mm to 25 mm.

6. The process as claimed in claim 1, comprising optionally drying the biomass before introducing in the pyrolyser.

7. The process as claimed in claim 6, wherein size of the heat carriers is preferably from 8 mm to 15 mm.

8. The process as claimed in claim 1, wherein the reactant is steam.

9. The process as claimed in claim 1, wherein the heat carriers are aluminium oxide, steel, titania.

10. The process as claimed in claim 1, wherein the heat carriers are preferably aluminium oxide.

11. The process as claimed in claim 10, wherein the catalyst is nickel oxide.

12. The process as claimed in claim 1 comprising reacting the pyrolysis gas with the reactant in the presence of a catalyst.

13. The process as claimed in claim 1 comprising maintaining the temperature in the pyrolyser between 450 deg C. to 650 deg C.

14. The process as claimed in claim 1, comprising maintaining the temperature in the reformer between 800 deg C. to 1200 deg C.

15. The process as claimed in claim 1, wherein the char is a high carbon containing residue.

16. The process as claimed in claim 15, comprising maintaining the temperature of the heat carriers in the input heater from 500 deg C. to 700 deg C.

17. The process as claimed in claim 15, wherein the input heater is preferably a fluidized bed combustor.

18. The process as claimed in claim 1 comprising taking the char and the heat carriers after pyrolysis to an input heater.

19. The process as claimed in claim 1 comprising separating the heat carriers from the char by means of a mesh separator after pyrolysis.

20. The process as claimed in claim 1 comprising cooling the product gas coming out of the reformer in a waste heat steam generator.

21. A process for generating a product gas from biomass, the process comprising the steps of:
   pyrolyzing the biomass in a pyrolyser by contacting the biomass with hot heat carriers to obtain pyrolysis gas and char;
   separating the hot heat carriers from the char by a separation means;
   transferring the char to a char burning section and heat carriers to an input heater;
   burning the char in the char burning section and transferring the hot gases generated from the burning to the input heater to heat the heat carriers;
   passing the pyrolysis gas to a reformer containing a reactant to obtain a product gas; and
   firing a part of the product gas coming out of the reformer inside radiant heater tubes of the reformer;
   wherein firing a part of the product gas through the radiant heater tubes of the reformer provides the heat for sustaining the reaction between the pyrolysis gas and the reactant to form the product gas.

22. A process for generating a product gas from biomass, the process comprising the steps of:
   pyrolyzing the biomass in a pyrolyser by contacting the biomass with hot heat carriers to obtain pyrolysis gas and char;
   transferring the char to a char burning zone and heat carriers to a heat carrier zone in an input heater;
   burning the char in the char burning zone thereby heating the heat carriers from the hot gases generated from burning the char;
   passing the pyrolysis gas to a reformer containing a reactant to obtain a product gas; and
   firing a part of the product gas coming out of the reformer inside radiant heater tubes of the reformer;
   wherein firing a part of the product gas through the radiant heater tubes of the reformer provides the heat for sustaining the reaction between the pyrolysis gas and the reactant to form the product gas.

23. The process as claimed in claim 21 or 22, comprising optionally drying the biomass before introducing in the pyrolyser.

24. A process for generating a product gas from a pyrolysis gas, the process comprising:
   introducing the pyrolysis gas to a reformer containing a reactant and a catalyst to obtain a product gas; and
   firing a part of the product gas coming out of the reformer inside radiant heater tubes of the reformer;
   wherein firing a part of the product gas through the radiant heater tubes of the reformer provides the heat for sustaining the reaction between the pyrolysis gas and the reactant to form the product gas.

* * * * *